US007519965B2

(12) United States Patent
Yoshida et al.

(10) Patent No.: US 7,519,965 B2

(45) Date of Patent: Apr. 14, 2009

(54) COMPUTER-READABLE MEDIUM RECORDED WITH A DEADLOCK PRE-DETECTION PROGRAM

(75) Inventors: Atsushi Yoshida, Kawasaki (JP); Hitoshi Tominaga, Kawasaki (JP); Tomohiro Nakamura, Kawasaki (JP); Yasunori Noritake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 833 days.

(21) Appl. No.: 10/800,612

(22) Filed: Mar. 15, 2004

(65) Prior Publication Data

US 2005/0086031 A1 Apr. 21, 2005

(30) Foreign Application Priority Data

Oct. 17, 2003 (JP) ............................ 2003-358268

(51) Int. Cl.
*G06F 9/46* (2006.01)
*G06F 11/00* (2006.01)
*G06F 7/00* (2006.01)
*G06F 17/30* (2006.01)
*G06N 5/00* (2006.01)

(52) U.S. Cl. ......................... 718/100; 706/45; 714/100; 707/1

(58) Field of Classification Search ..................... 718/1, 718/100-108; 707/1-206; 717/100-178; 706/45-48; 714/26, 100
See application file for complete search history.

(56) References Cited

U.S. PATENT DOCUMENTS 5,668,988 A * 9/1997 Chen et al. .................. 707/101
5,742,811 A * 4/1998 Agrawal et al. ................ 707/6

(Continued)

FOREIGN PATENT DOCUMENTS

JP 64-070838 3/1989

(Continued)

OTHER PUBLICATIONS

Nierstrasz, Oscar Marius. "Message Flow Analysis." Department of Computer Science, University of Toronto. Nov. 1984.*

(Continued)

*Primary Examiner*—Meng-Ai An
*Assistant Examiner*—Qing-Yuan Wu
(74) *Attorney, Agent, or Firm*—Greer, Burns & Crain, Ltd.

(57) ABSTRACT

A computer-readable medium recorded with a deadlock pre-detection program for making a computer execute a first procedure of making the computer read job logic design information structured of a plurality of process steps including an access step involving an access to any one of a plurality of databases, a second procedure of generating a process route configured of at least two access steps on the basis of the job logic design information, a third procedure of acquiring the first access step and the second access step from the process route, a fourth procedure of judging whether a data base access sequence based respectively on the first step and the second step is a predetermined access sequence or not, and a fifth procedure of notifying of, in the case of judging that the access sequence is not the predetermined access sequence, a purport of deviating from the predetermined access sequence.

4 Claims, 17 Drawing Sheets

U.S. PATENT DOCUMENTS

| | | | | |
|---|---|---|---|---|
| 6,029,002 | A * | 2/2000 | Afifi et al. | 717/131 |
| 6,138,112 | A * | 10/2000 | Slutz | 707/2 |
| 6,173,308 | B1 * | 1/2001 | Hilditch et al. | 718/106 |
| 6,230,206 | B1 * | 5/2001 | Doole et al. | 709/235 |
| 6,581,052 | B1 * | 6/2003 | Slutz | 707/2 |
| 6,816,874 | B1 * | 11/2004 | Cotner et al. | 707/204 |
| 7,007,007 | B2 * | 2/2006 | Slutz | 707/2 |
| 7,117,191 | B2 * | 10/2006 | Gavan et al. | 706/47 |
| 7,194,475 | B2 * | 3/2007 | DelMonaco et al. | 707/102 |
| 2002/0082886 | A1 * | 6/2002 | Manganaris et al. | 705/7 |
| 2003/0041315 | A1 * | 2/2003 | Bates et al. | 717/129 |

FOREIGN PATENT DOCUMENTS

| | | | |
|---|---|---|---|
| JP | 05-094290 | | 4/1993 |
| JP | 06-103091 | | 4/1994 |
| JP | 09-233150 | | 9/1997 |
| JP | 10-049389 | | 2/1998 |
| JP | 10-228387 | | 8/1998 |
| JP | 11259350 | A * | 9/1999 |
| JP | 2000-222228 | | 8/2000 |
| JP | 2006252583 | A * | 9/2006 |

OTHER PUBLICATIONS

Nesheiwat, Jeffrey et al. "Instrumentation Database for Performance Analysis of Parallel Scientific Applications." Springer Berlin / Heidelber, vol. 1511/ May 1998.*

Teng et al., "Adaptive Real-time Anomaly Detection Using Inductively Generated Sequential Patterns", 1990, IEEE, pp. 278-284.*

Teng et al., "Security Audit Trail Analysis Using Inductively Generated Predictive Rules", 1990, IEEE, pp. 24-29.*

Lee et al., "Data Mining Approaches for Intrusion Detection", 2000, ACM, pp. 1-15.*

Lee et al., "Mining in a Data-flow Environment: Experience in Network Intrusion Detection", 1999, ACM, pp. 114-124.*

Lee et al., "Learning Patterns from Unix Process Execution Traces for Intrusion Detection", 1997, ACM, pp. 1-8.*

Tomohisa Ishikawa: "Basic Knowledge of Transaction Management, from ACID Attribute to Two-phase Commit"; WEB+DB Press, Publisher: Kabushiki Kaisha Gijutsu Hyoron-sha, Mar. 15, 2003, vol. 13, pp. 15-23 (Patent Office DSDB No. National Technical Journal 2004-00354-012).

* cited by examiner

FIG. 8

EXAMPLE OF DESCRIPTION OF DATA SPECIFICATIONS

```
ROLE: USER INFORMATION
TABLE NAME:CT_TUSRPAR
AVERAGE NUMBER OF RECORDS:3000

COLUMN:USERNUM      CHAR(32)  MANAGEMENT NUMBER  PLIMARYKEY
       USRNAME      CHAR(32)  USER NAME
       USRPWD       CHAR(32)  PASSWORD
       USRCOMP      CHAR(32)  BELONGING COMPANY CODE
        CORRESPONDS CT_TCMPCOM.COMID
         TYPE=1:1
         ACCESS-SQUESNCE USRCOMP.>CT_TCMPCOM.COMID
       USROFFICE    CHAR(32)  BELONGING OFFICE CODE
       USRBELONG    CHAR(32)  BELONGING ORGANIZATION CODE
       MAILADDR     CHAR(512) MAIL ADDRESS
       PHONENUMBER  CHAR(12)  TELEPHONE NUMBER
       FAXNUMBER    CHAR(12)  FAX NUMBER
```

SAME CORRESPONDENCE AS COLUMN COMID IN TABLE CT_TCMPCOM IS 1 : 1, EXTRACT USERCOMP, AND REFER TO RECORD IN WHICH COMID IS COINCIDENT WITH THIS IN CT_TCOMCOM

ACTUALIZING FORMAT ON COMPUTER IS XML-BASED DESCRIPTION OR INVOLVES USING Java CLASS AND C++ CLASS GENERATED FROM XML-BASED DESCRIPTION

FIG. 9

EXAMPLE OF DESCRIPTION OF DATA SPECIFICATIONS (XML-BASED REPRESENTATION)

```
<data-definition>
  <header><table-name>CT_SUSRPAR</table-name>
     <table-role>USER INFORMATION</table-role>
     <average-hit-records>3000</average-hit-records>
  </header>
 <columns>
 <column is-Primary-key="true">
  <name>USERNUM</name><type>char32</type><role>MANAGEMENT NUMBER</role>
 <column>
 <column> <name>USERNAME</name><type>char32</type><role>USER NAME</role></column>
 <column> <name>USRPWD</name><type>char32</type><role>PASSWORD</role></column>
 <column> <name>USCOMP</name><type>char32</type><role>BELONGING COMPANY CODE>
  <corresponds><tblcolumn>CT_TCMPCOM.COMID</tblcolumn>
  <access-seq>USRCOMP,CT_TCMPCOM.COMID</access-seq>
  </corresponds>
</column>
 <column> <name>USROFFICE</name><type>char32</type><role>BELONGING OFFICE CODE</role>
 </colum>
 <column> <name>USRBELONG</name><type>char32</type><role>BELONGING ORGANIZATION CODE</role>
 </column>
 <column> <name>MAILSDDR</name><type>char512</type><role>MAIL ADDRESS</role>
 </column>
 <column> <name>PHONENUMBER</name><type>char12</type><role>TELEPHONE NUMBER</role>
 </colum>
 <column> <name>FAXNUMBER</name><type>char12</type><role>FAX NUMBER</role>
 </colum>
 </columns>
</data-definition>
```

DESCRIBE TABLE NAME, ROLE, AVERAGE NUMBER OF HIT RECORDS IN HEADER FIELD, AND DESCRIBE COLUMN NAME, TYPE, LENGTH AND ROLE OF COLUMN, AND COLUMN NAME, COLUMN SEQUENCE, ETC. OF OTHER TABLE HAVING SAME ROLE AS ABOVE

*FIG. 11*

EXAMPLE OF STANDARD DATA ACCESS SEQUENCE

| TABLE NAME | ORDER | |
|---|---|---|
| PURCHASE REQUEST SLIP | 1 | |
| ITEM INFORMATION | 2 | |
| PURCHASE APPLICANT INFORMATION | 3 | 300 CASES ON AVERAGE ARE HIT |
| IN-CHARGE-OF-SALES PERSON INFORMATION | 3 | 1500 CASES ON AVERAGE ARE HIT |
| COMMERCIAL ARTICLE INFORMATION | 5 | 3000 CASES ON AVERAGE ARE HIT |
| PRICE INFORMATION | 6 | |
| PURCHASE ENTERPRISE INFORMATION | 7 | |
| SALES ENTERPRISE INFORMATION | 8 | |

GIVING PRIORITIES OF RESPECTIVE TABLES ACCORDING TO PROCEDURES IN FIG. 11
THERE IS OBTAINED ANTERIORITY/POSTERIORITY RELATION SUCH AS PURCHASE SLIP INFORMATION>ITEM INFORMATION>COMMERCIAL ARTICLE INFORMATION>PRICE INFORMATION>PURCHASE ENTERPRISE INFORMATION/SALES ENTERPRISE INFORMATION/PURCHASE REQUEST SLIP>IN-CHRGE-OF-PURCHASE PERSON INFORMATION>PURCHASE ENTERPRISE INFORMATION/PURCHASE REQUEST SLIP>IN-CHARGE-OF-SALES PERSON INFORMATION>SALES ENTERPRISE INFORMATION, HOWEVER ANTERIORITY/POSTERIORITY RELATIONS BETWEEN PURCHASE APPLICANT INFORMATION AND SALES APPLICANT INFORMATION AND BETWEEN PURCHASE APPLICANT/IN-CHARGE-OF-SALES PERSON INFORMATION AND COMMERCIAL ARTICLE INFORMATION/ PRICE INFORMATION ARE NOT DETERMINED ONLY FROM THIS.
SUCH BEING THE CASE, ANTERIORITY/POSTERIORITY RELATIONS ARE ESTABLISHED BY USE OF HEURISTICS SUCH AS AVERAGE VALUE OF RECORD HIT CASE COUNT, ETC.
HEREIN, ORDER IS GIVEN BY SUCH HEURISTICS THAT PURCHASE APPLICANTS ARE LESS THAN SALES APPLICANTS IN HIT RECORD CASE COUNT, AND PURCHASE APPLICANTS AND IN-CHARGE-OF-SALES PERSONS ARE LESS THAN COMMERCIAL ARTICLES IN AVERAGE VALUE OF HIT RECORD CASE COUNT.

COMPUTER-READABLE MEDIUM RECORDED WITH A DEADLOCK PRE-DETECTION PROGRAM

BACKGROUND OF THE INVENTION

The invention relates to a technology for detecting a possibility of a deadlock beforehand without actually running a deadlock detection object program.

A technology has hitherto been proposed as a deadlock detection method, wherein a deadlock is detected by executing a procedure (process steps) as a deadlock detection object, or by analyzing a data access sequence obtained as a simulation.

FIG. 17 shows an example of this deadlock detection method. FIG. 17 shows that a history (a SQL history in FIG. 17) of an on-execution application having accessed a database is recorded by a history extractor (an SQL history extractor in FIG. 17), a deadlock detector executes a predetermined process on the basis of this access history, and a result of detecting the deadlock is thereby outputted (refer to, e.g., Patent document 1 and Patent document 2, etc.).

[Patent document 1] Japanese Patent Application Laid-Open Publication No.2000-222228

[Patent document 2] Japanese Patent Application Laid-Open Publication No.10-49389

According to the conventional deadlock detection method, however, the detection of the deadlock requires an actual execution of a deadlock detection object program. Hence, there arise the following problems.

(1) None of deadlocks other than the deadlock with respect to only the actually operated element can be detected. In other words, it is difficult to prove that the deadlocks with respect to all the cases (all the process routes) have been detected (all-inclusive detection). Especially in the case of authenticating a program at a multi-access time, it is, as a matter of fact, almost impossible to check all the possibilities.

(2) The check is performed after the program has already been created, and hence there increases a cost for modifying the program in order to obviate the deadlock (the modifying cost is 10 times to 100 times as large as the modification at a design stage).

(3) In the case of developing respective pieces of job logic by sharing, there is a scatter in implementation of the data access sequence, depending on a person in charge, and hence the deadlock might occur. This problem can not, however, be obviated by the method of checking after the program has been created.

A first object of the invention lies in detecting a deadlock possibility beforehand without actually running a program as a deadlock detection object. Further, a second object of the invention lies in enabling a user to adopt a measure, etc. for avoiding the deadlock possibility by notifying the user of the measure, etc. for avoiding the thus-detected deadlock possibility.

SUMMARY OF THE INVENTION

The invention has the following architecture for solving the problems given above. A deadlock pre-detection program makes a computer execute a first procedure of making the computer read job logic design information structured of a plurality of process steps including an access step involving an access to any one of a plurality of databases, a second procedure of generating a process route configured of at least two access steps on the basis of the job logic design information, a third procedure of acquiring the first access step and the second access step from the process route, a fourth procedure of judging whether a data base access sequence based respectively on the first step and the second step is a predetermined access sequence or not, and a fifth procedure of notifying of, in the case of judging that the access sequence is not the predetermined access sequence, a purport of deviating from the predetermined access sequence.

According to the invention, the deadlock possibility can be detected at a stage of designing a program (i.e., at a job logic design creation stage) configuring a job system. Namely, the deadlock possibility can be detected beforehand without actually running a deadlock detection object program.

Thus, the deadlock possibility can be detected beforehand, and hence there does not increase a cost for modifying the program in order to obviate the deadlock. Further, in the case of developing the job logic by sharing, it is feasible to reduce the deadlock possibility due to a scatter in implementation of a database access sequence, which might occur depending on a person in charge.

Moreover, in the deadlock pre-detection program, for instance, the job logic design information is structured of a plurality of process steps including the access step and a branching condition step, the second procedure involves generating at least two process routes structured of at least two access steps on the basis of the job logic design information, the third procedure involves acquiring, for every process route, a first access step and a second access step from the process route, and the fourth procedure involves judging, for every process route, whether a database access sequence by the first access step and the second access step is a predetermined access sequence or not.

With this contrivance, even when a plurality of process routes are generated, the deadlock possibility can be detected in an all-inclusive manner with respect to all the process routes by via respective branching destinations of the branching condition step.

Further, the deadlock pre-detection program may further comprise a sixth procedure of having associative relational data read out, which represent associative relations between a plurality of databases, and a seventh procedure of generating the predetermined access sequence on the basis of the associative relational data.

This gives one example of how the predetermined access sequence can be acquired. An access sequence inputted (set) by the user, etc. may also be used as the predetermined access sequence.

With this contrivance, the predetermined access sequence can be automatically generated.

Further, in the deadlock pre-detection program, for instance, the third procedure involves acquiring the first access step and the second access step next to the first access step from the process route, the fourth procedure involves judging whether the database access sequence respectively by the first access step and the second access step is the predetermined access sequence or not, and the fifth procedure involves notifying, in the case of judging that the access sequence is not the predetermined access sequence, that the database access by the first access step is conducted anterior to the database access by the second access step.

With this contrivance, the user is notified of a purport that the database access by the first access step is conducted anterior to the database access by the second access step, i.e. notified of a measure, etc. for avoiding the deadlock possibility.

Accordingly, the user receiving this notification can take the measure, etc. for avoiding the deadlock possibility. Moreover, there is determined the standard data access sequence in the respective pieces of job logic configuring the job system, for example, in the job logic such as issuance and approvals of an estimation request slip and of a purchase request slip, and the data access sequences in the respective pieces of job logic can be also unified.

Further, the deadlock pre-detection program further comprises, for example, an eighth procedure of having the multi-access description and the process route read out, and a ninth procedure of generating information about a possibility of an occurrence of the deadlock in the case of simultaneously executing the job logic structured of the plurality of process steps on the basis of the multi-access description and the process route.

With this contrivance, the deadlock possibility at the multi-access time can be detected, and the measure for avoiding the deadlock can be taken.

Furthermore, the invention can be also specified as a readable-by-computer storage medium stored with the deadlock pre-detection program.

DESCRIPTION OF THE DRAWINGS

FIG. 8 is an example of a description of data specifications.

FIG. 9 is an example of a description of data specifications (XML representation).

FIG. 11 is an example of the standard data access sequence.

DETAILED DESCRIPTION OF THE INVENTION

A deadlock prevention system, to which a program as one embodiment of the invention is applied, will hereinafter be described with reference to the drawings.

(Outline of System Architecture of Deadlock Pre-detection System)

Figure 1:
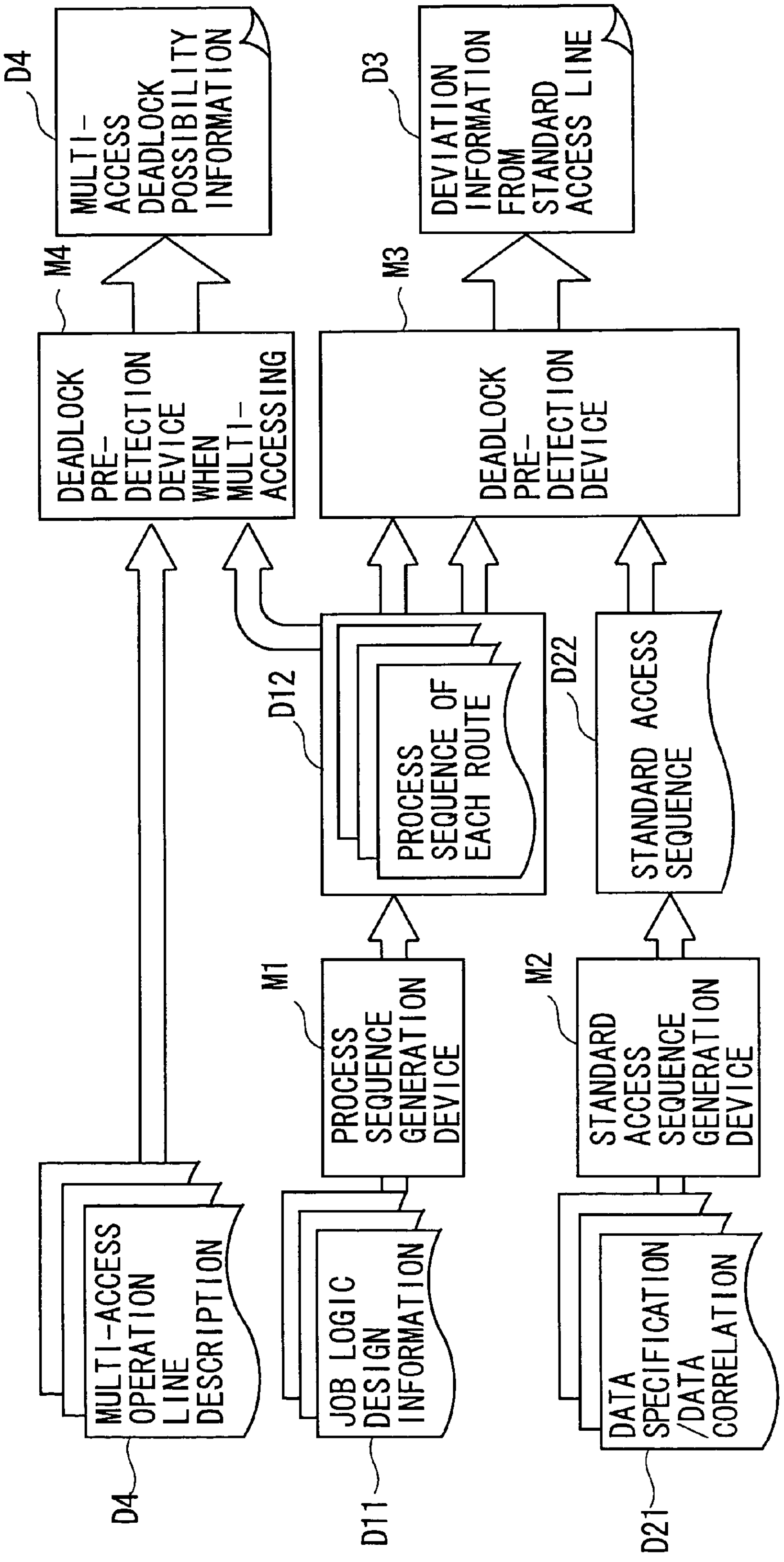
FIG. 1 is an explanatory diagram of an outline of a system architecture of a deadlock pre-detection system (to which a deadlock pre-detection program is applied) in an embodiment.

FIG. 1 is an explanatory diagram of an outline of a system architecture of a deadlock pre-detection system in the embodiment. As shown in FIG. 1, the deadlock pre-detection system in the embodiment includes a process sequence generation device M1, a standard access sequence generation device M2, a deadlock pre-detection device M3, a multi-access time deadlock pre-detection device M4, and a storage device such as a hard disk, etc. stored with various categories of data (such as job logic design information D11, a data specification data correlation D21, multi-access operation line (system) description D4, etc.) read by the respective devices M1 through M4. An existing information processing terminal such as a personal computer, etc. reads a predetermined program and executed this program, thereby actualizing those devices M1 through M4.

(Process Sequence Generation Device)

The process sequence generation device M1 reads the job logic design information D11 from the storage device and executes, based on the job logic design information D11, processes (see FIGS. 3 and 4) which will be mentioned later on. The process sequence generation device M1 thereby generates a process sequence (process route) of each route.

(Job Logic Design Information)

The job logic design information D11 is structured of a plurality of process steps. The whole of these plural process steps structures logic (for example, job logic for acquiring a list of purchase request slips) for a specified job. The process steps are an access step involving an access to any one of a plurality of databases (which may also be called tables), a branching condition step, a start step, an end step, etc.

The job logic design information D11 can be created by a variety of methods. In the embodiment, the plurality of process steps are described in a simple language such as a Script language, etc. that can be processed by the information processing terminal. Note that the job logic design information D11 described in the Script language becomes executable by encoding the information D11 into an execution-formatted program.

Figure 2:
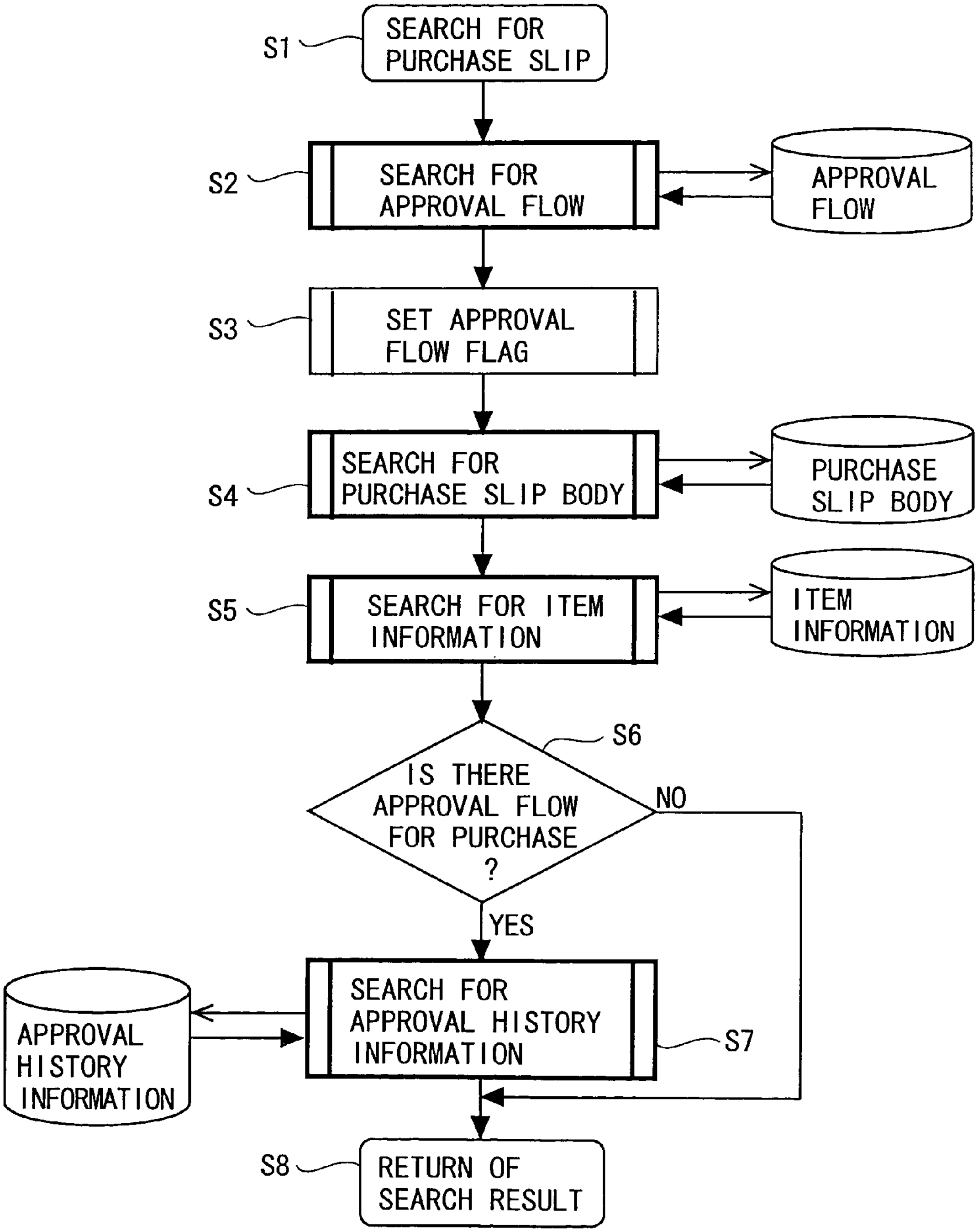
FIG. 2 is an explanatory diagram of job logic for acquiring a list of purchase request slips.

Next, the job logic for acquiring the list of purchase request slips will be explained by way of a specific example of the job logic design information D11. FIG. 2 is an explanatory diagram of the job logic for acquiring the list of purchase request slips.

This piece of job logic design information D11 is structured of a plurality of process steps S1-S8 such as a start step S1, accesses steps S2, S4, S5, S7 to the database, a flag setting step S3, a branching condition step S6 and an end step S8.

Given next are explanations of details of the process contents in the respective steps and of an example of describing the respective steps (as represented by, e.g., operations, operation objects, etc.) in the Script language.

In the start step S1, a process content is "a start of searching for a purchase slip", and a description example is "start". In the access step S2, a process content is "a search for an approval flow (searching an approval flow database for approval flow information in an organization to which a job logic execution person belongs)(an access to the database by referring (through a reference system))", and a description example is "read the approval flow database". This description example represents an occurrence of access to the approval flow database.

In the flag setting step S3, a process content is "set the approval flow flag ON in a case where the approval flow is detected by the search in S2", and a description example is "set apr_flow_flag". This description example represents that apr_flow_flag is set.

In the access step S4, a process content is "a search for the purchase request slip (an access to the database through the reference system)", and a description example is "read a purchase slip body database". This description example represents an occurrence of access to the purchase slip body database.

In the access step S5, a process content is "a search for item information of each slip detected as a result of the search (searching the database through the reference system)", and a description example is "read the item information database". This description example represents an occurrence of access to the item information database.

In the branching condition step S6, a process content is "whether the flag is set ON or not is judged by referring to the approval flow flag", and a description example is "check apr_flow-flag if true S7 if false S8". This description example represents that if check apr_flow-flag is trues, S7 is executed, whereas if check apr_flow-flag is false, S8 is executed.

In the access step S7, a process content is "if the approval flow flag (check apr_flow-flag) is set ON, an approval history information database associated with the slip searched for in S4 is searched (accessing the database through the reference system)", and a description example is "read the approval history information database". This description example represents an occurrence of access to the approval history information database.

In the end step S8, a process content is "return a search result (containing the purchase request slip, the item information, and also the approval history information in the case of the approval flow flag being ON)", and a description example is "end".

(Process of Generating Process Route Information)

Figure 3:
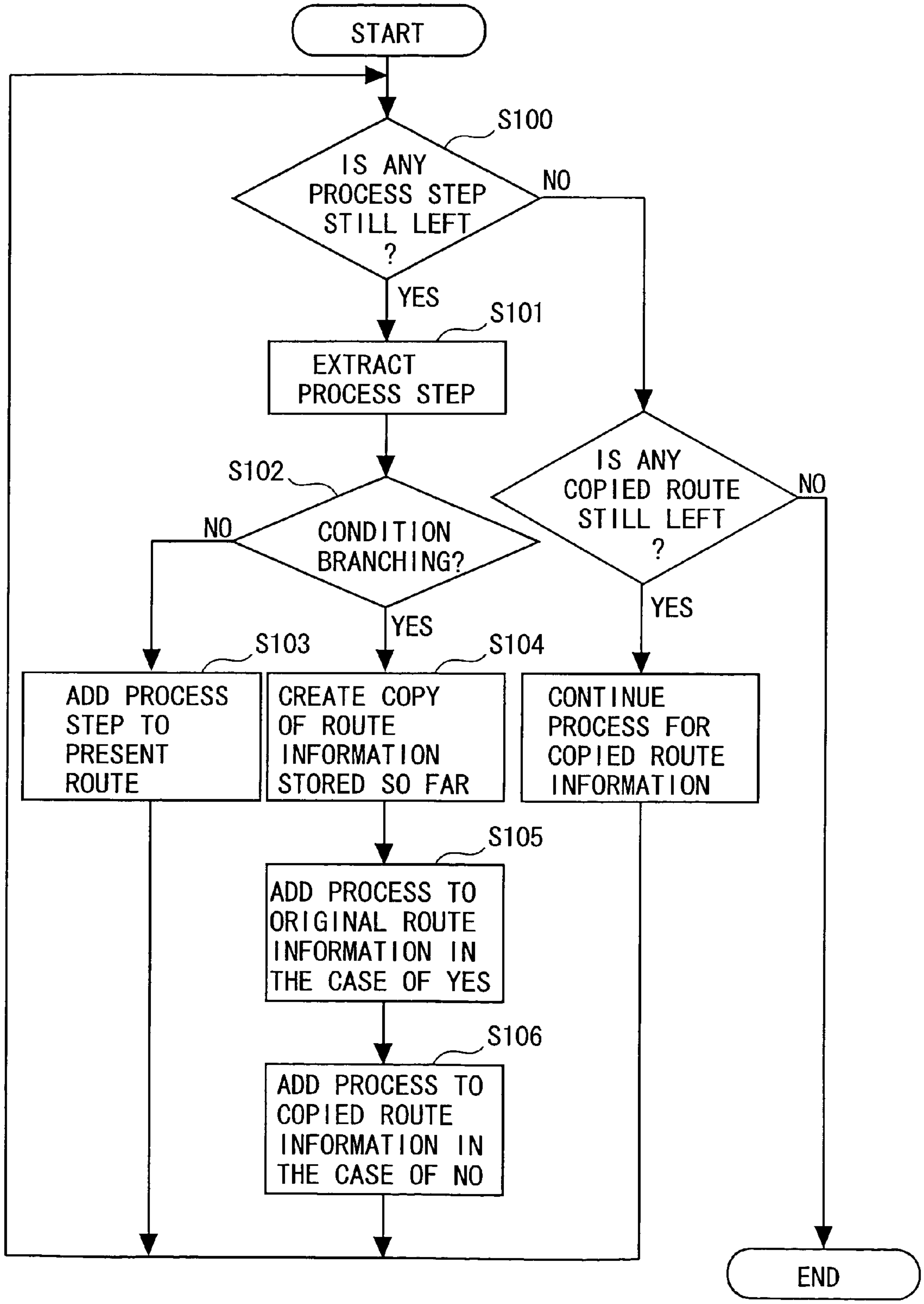
FIG. 3 is an explanatory flowchart of a process of generating the process route information.

Given next is an explanation of a process in which the process sequence generation device M1 generates process route information (a process sequence of each route) on the basis of the job logic design information D11. FIG. 3 is an explanatory flowchart of the process of generating the process route information. The process procedures are given as below.

The process sequence generation device M1 executes the following processes with respect to the process steps S1 through S8 structuring the job logic design information D11.

The process sequence generation device M1 extracts the process steps one by one from the job logic design information D11 (S100: Yes, S101), and judges whether or not the extracted process step is a condition branching step (S102). Then, the process sequence generation device M1, if the extracted process step is not the condition branching step (S102: No), stores (adds) the extracted process step in a present piece of process route information R1 (S103).

Referring to FIG. 2, the first process steps S1 through S5 of the job log are not the condition branching steps. Therefore, the process sequence generation device M1 stores (adds) the first process steps S1 through S5 in the present process route information R1 (S100-S103).

Next, the process sequence generation device M1 extracts the process step S6 from the job logic design information D11 (S100: Yes, S101). This process step S6 is the condition branching step (if statement) (S102: Yes), and therefore the process sequence generation device M1 generates a copy R2 (stored with the process steps S1 through S5) of the present process route information R1 (S104).

Then, the process sequence generation device M1 executes a process of storing (adding) the process route information R1 with the process step (S7 in FIG. 2) in a case where the condition is established (S6: Yes in FIG. 2) (S105). Contents stored in the process route information R1 thereby become the process steps S1 through S5 and S7. On the other hand, the process sequence generation device M1 executes a process of storing (adding) the process route information R2 with the process step (S8 in FIG. 2) in a case the condition is not established (S6: No in FIG. 2) (S106). Contents stored in the process route information R2 thereby become the process steps S1 through S5 and S8. This represents a process sequence of one route (which will hereinafter be called a route 2).

Subsequently, the process sequence generation device M1 extracts the process step S8 from the job logic design information D11 (S100: Yes, S101). This process step S8 is not the condition branching step, and hence the process sequence generation device M1 adds this process step S8 to the present process route information R1 (S103). Consequently, the contents stored in the process route information R1 become the steps S1 through S5, S7 and S8. This represents a process sequence of another route (which will hereinafter be termed a route 1).

Figure 4:
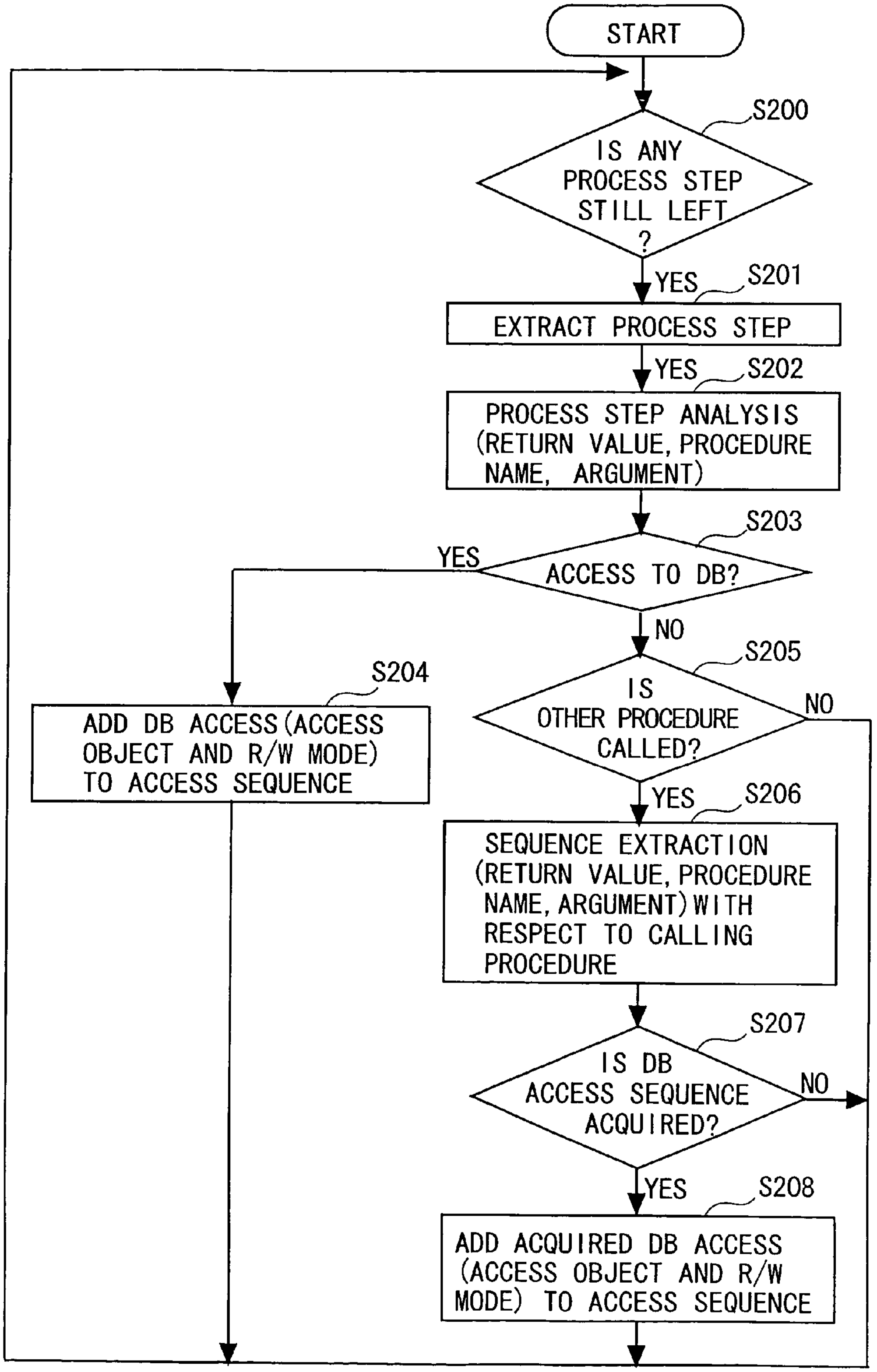
FIG. 4 is an explanatory flowchart of a sequence extraction process.

A sequence extraction process shown in FIG. 4 is executed for each of the process sequences of the routes 1 and 2.

FIG. 4 is an explanatory flowchart of a process of extracting a data access sequence (see FIG. 6) with respect to the process routes (the process sequences of the routes 1 and 2). The process procedures are given as follows.

The process sequence generation device M1 executes the following processes for the respective process routes.

The process sequence generation device M1 generates a null sequence as an access sequence (a database access sequence). Then, the process sequence generation device M1 extracts the process steps one by one from the process route 1 (S200: Yes. S201), and analyzes the extracted process steps. Specifically, the process sequence generation device M1 analyzes a return value, a procedure name and an argument (or operations such as Read, Write, etc. from and to the database, and an operation object database such as an approval flow database, etc.) of the process step.

Figure 5:
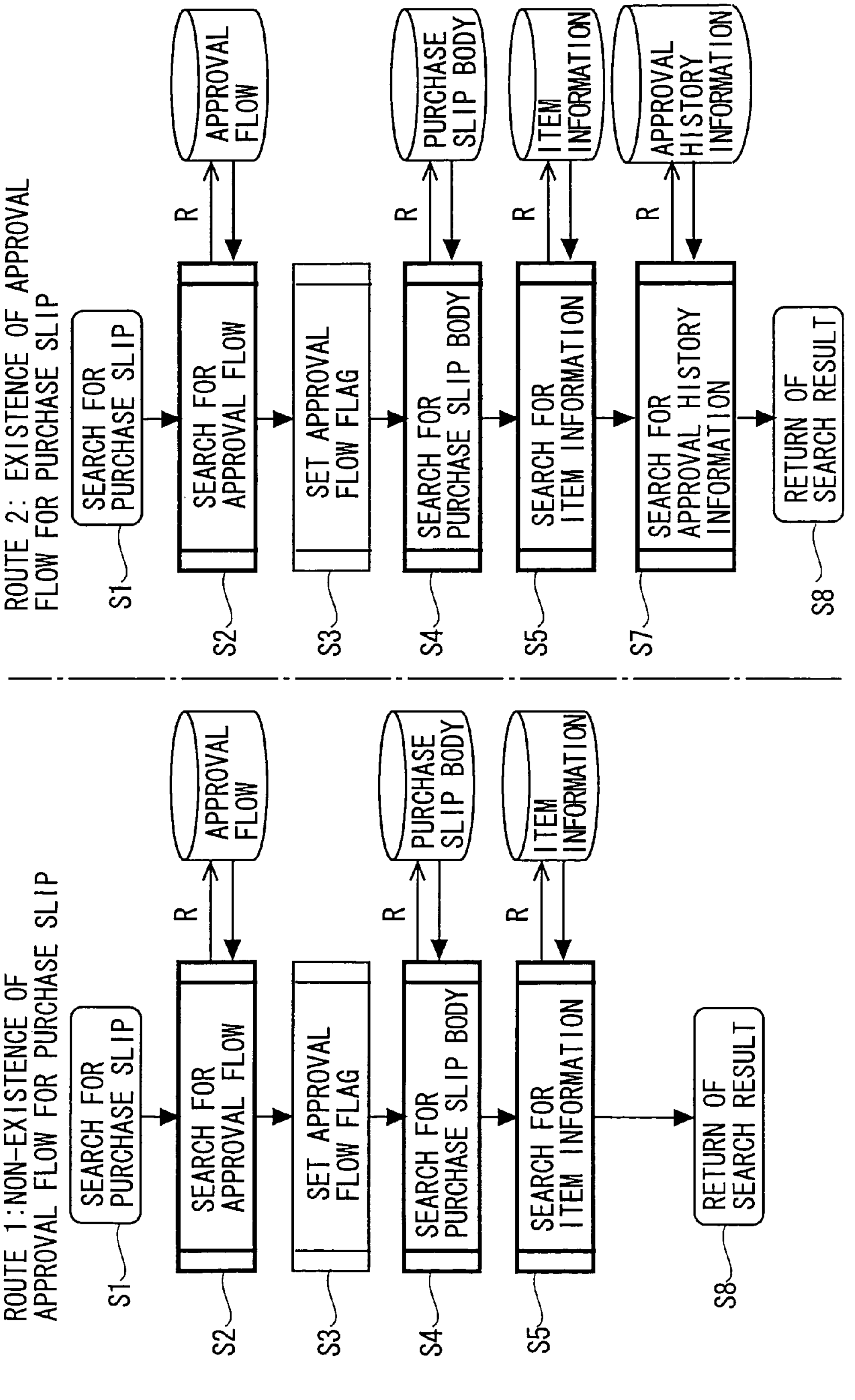
FIG. 5 is an example of process route information.

As a result of this analysis, in a case where the process step is an access to the database (S203: Yes), the process sequence generation device M1 stores (adds) the access sequence with a pair of the access object database (table) and an access content (a distinction between Read and Write or distinction between R mode and W mode (S204). For instance, as for the process route 1, as shown in FIG. 5, S2, S4 and S5 among the process steps structuring this route involve the access to the database. On the other hand, as for the route 2, S2, S4, S5 and S7 among the process steps structuring this route involve the access to the database.

Accordingly, the process sequence generation device M1, as for the route 1, stores (adds) the access sequence with the pair of the access object database and the operation contents thereof in the sequence such as the approval flow database (Read) the purchase slip body database (Read) the item information database (Read) (S203: Yes, S204). Further, the process sequence generation device M1, as for the route 2, stores (adds) a different access sequence with the pair of the access object database and the operation contents thereof in the sequence such as the approval flow database (Read) the purchase slip body database (Read) the item information database (Read) the approval history information database (Read) (S203: Yes, S204).

On the other hand, with respect to both of the process routes 1 and 2, as shown in FIG. 5, S1, S3, S6 and S8 among the process steps structuring these routes do not involve the access to the database (S203). In this case, there is no call for other procedures (S205: No), and hence the process sequence generation device M1 repeats processes from S200 onwards.

As discussed above, the access sequences of the process routes 1 and 2 are stored (added) with the pairs of the access object databases and the access contents thereof in sequence.

Accordingly, it is possible to grasp the access object databases of the process routes 1 and 2 and the access sequence to the respective databases by referring to those access sequences.

On the other hand, as a result of the analysis in S202, in a case where the process step is not the access to the database (S203: No), the process sequence generation device M1 judges whether the process step is the procedure call or not (S205). As a result of this judgment, in the case of the process step being the procedure call (S205: Yes), the process sequence generation device M1, for the calling procedure, recursively executes this procedure, and adds an access sequence acquired (S206-S208). Note that it is also possible to take a method of preparing beforehand, for the respective procedures having a calling possibility, the access sequences executed when calling the procedures, and acquiring and adding the access sequence associated directly with the procedure call.

Note that the explanation has been made such that whether or not the process step extracted from the job logic design information is the condition branching step, is judged based on whether the process step extracted in S102 is the if-statement or not, however, the judgment is not limited to this. For instance, the judgment may be made based on whether the same process step is a switch-statement (or other condition branching statement) or not.

Incidentally, in a case where the condition judgment using the if-statement is made N-times, there are generated pieces of route information of process routes of a value given by raising 2 to the N-th power. In a case where there are multi-value branches, the route information of process routes of a numerical value multiplied by the number of choices in the respective branches, are generated. For example, in such a case that the if-statement occurs four times and there occur the multi-value branches of a value "4" and a multi-value branches of a value "5", the route information of 320 process routes given by 24×4×5=320, is generated.

Figure 6:
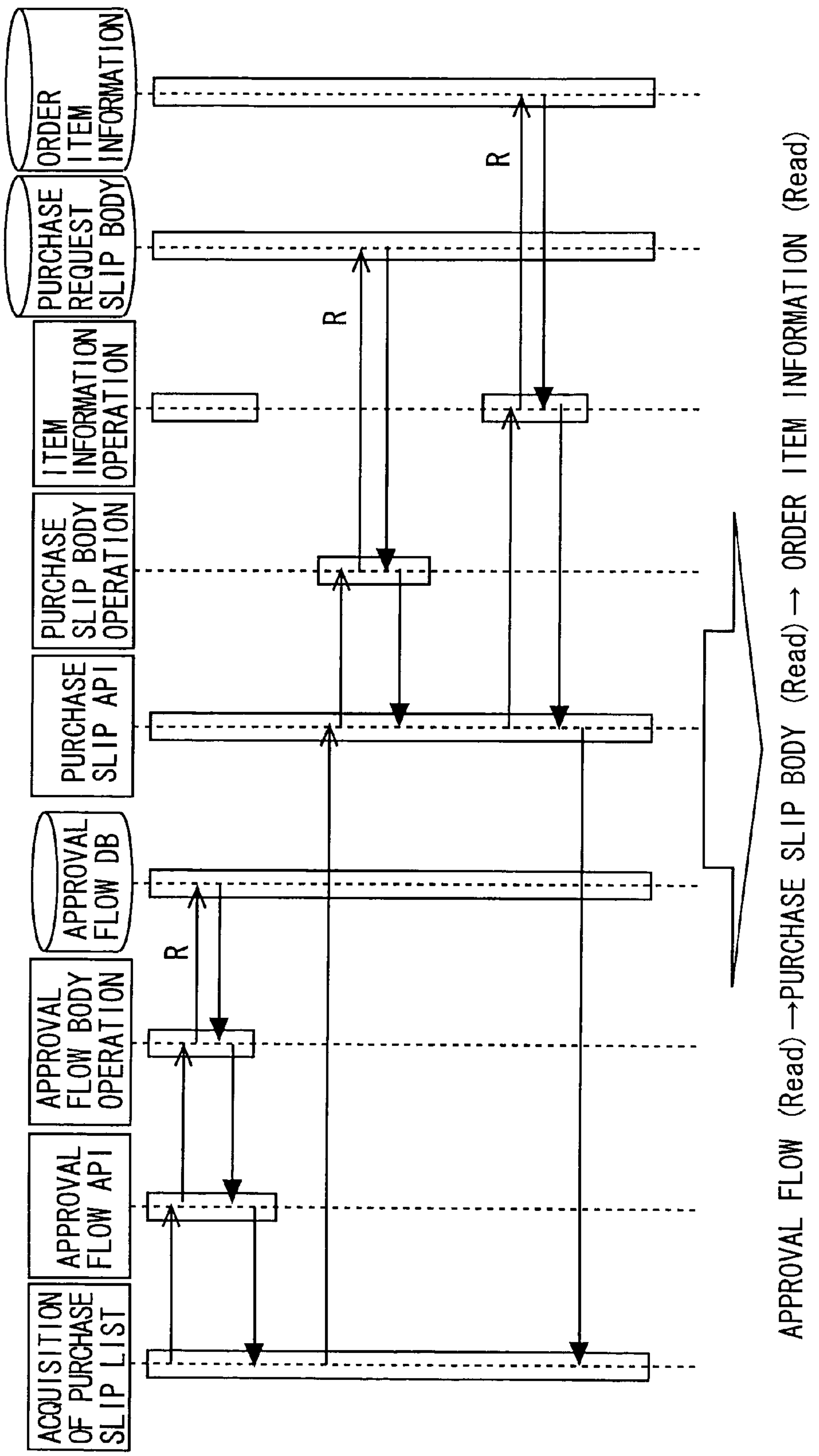
FIG. 6 is an example of a data access sequence diagram.

Note that FIG. 6 is a diagram of a data access sequence in one of the process routes in the process route information generated from the job logic design information shown in FIG. 2. FIG. 6 is the diagram of the data access sequence in the case of the approval flow flag being set OFF in the two process routes shown in FIG. 5. A main job logic is "an acquisition of a purchase slip list" shown at the left end in FIG. 6.

In FIG. 6, there is referred to the database of the approval route through the two procedures of the approval flow API and the approval flow body operation when referring to the approval route. When referring to the purchase slip body, the database of the purchase slip body is referred to through the two procedures of the purchase slip API and the approval slip body operation. When referring to the item information, the database of the item information is accessed through the two procedures of the purchase slip API and the item information operation.

(Standard Access Sequence Generation Device)

The standard access sequence generation device M2 reads the data specification data correlation D21 from the storage device, and executes processes (see FIG. 10) which will hereinafter be described on the basis of the data specification data correlation D21, thereby generating a standard access sequence D22.

(Data Specification Data Correlation)

Figure 7:
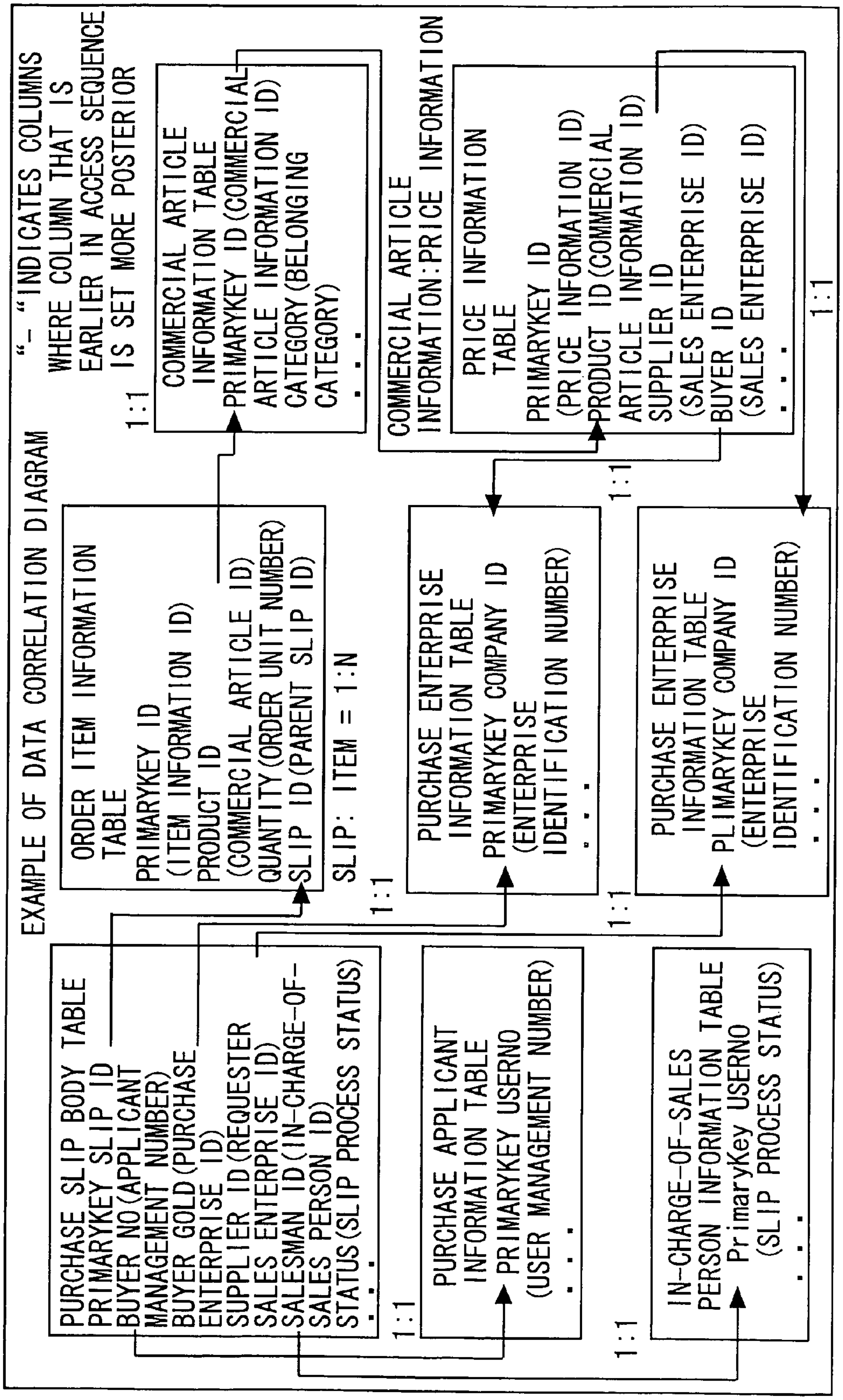
FIG. 7 is an example of a data correlation chart.

FIG. 7 is an explanatory diagram of an example of a data correlation chart. Herein, for an explanatory convenience, the discussion will be made by taking up a plurality of databases different from the databases shown in FIG. 2. This data correlation chart visibly represents associative relations between the plurality of databases in order to determine a standard access sequence for the plurality of databases. Note that examples of the associative relational data representing the associative relation are shown in FIGS. 8 and 9 (of which details will be explained later on).

FIG. 7 shows eight pieces of tables by way of the plurality of databases, i.e., there are shown a purchase slip body table, an order item information table, a purchase applicant information table, a person-in-charge-of-sales information table, a commercial article information table, a price information table, a purchase enterprise information table and a sales enterprise information table.

The associative relation between these tables is indicated by an arrowhead line connecting the two tables. Namely, a column pointed by a front end (distal end) of the arrowhead line is a column to be accessed posterior to a column (indicated by a proximal end of the arrowhead line) from which the arrowhead line is extended. Two tables, for example, the purchase slip body table and the order item information table are connected in such a way that the proximal end of the arrowhead line indicates slipID (Primary Key) in the purchase slip body table, and the proximal end thereof indicates slipID in the order item information table. This implies that slipID pointed by the distal end of the arrowhead line in the order item information table, is accessed posterior to slipID (Primary Key) pointed by the proximal end of the arrowhead line in the purchase slip body table. Namely, in the purchase slip body and the order item information, slipID (Primary Key) of the purchase slip body is acquired, and the search is performed under a condition that slipIP pointed by the distal end of the arrowhead line for the order item information table is the same as slipID of the purchase slip body.

Further, the associative relation between the tables may also be what is given as follows. Referring to FIG. 7, the column slipid in the order item information table has a value of the column slipid (Primary Key) of the purchase slip body table, and the associative relation between the order item information and the purchase request slip is N:1 (one case of purchase request slip is associated with N-cases of order item information). Similarly, productId of the price information table has a value of a primary key id of the commercial article information, and the associative relation between the price information and the commercial article information is N:1 (one case of commercial article information is associated with N-cases of price information). Further, productId of the order item information has a value of id of the commercial article information, and the associative relation between the order item information and the commercial article information is 1:1 (one case of order item information is associated with one case of commercial article information). Theses N:1 and 1:1 also serve to represent the associative relation between the tables.

The information processing terminal retains the associative relations between the tables shown in FIG. 7 as the associative relational data representing those associative relations. FIG. 8 is an explanatory diagram of an example of associative relational data (data specification data correlation) representing the associative relations between the tables.

Herein, for an explanatory convenience, the discussion will be made by adopting a table (CT_TUSRPAR table) different from the plurality of tables shown in FIG. 7. Incidentally, as a matter of fact, data corresponding to the associative relational data representing the associative relations between the tables shown in FIG. 8, exist for the respective tables shown in FIG.

7. FIG. 9 is an example in which the associative relational data in FIG. 8 are described in an XML language. Note that the associative relational data in FIG. 8 can be described in a variety of languages such as Java, C++, etc. in addition to XML.

FIG. 8 shows the associative relational data (data specifications) for the CT_TUSRPAR table stored with user information. The data specifications contain associative relational data representing an associative relation between the CT_TUSRPAR table and a CT_TCMPCOM table. This piece of associative relational data corresponds to "CORRESPONDS CT_TCMPCOM.COMID(feed)TYPE=1:1(feed) ACCESS-SEQUENCE USRCOMP->CT_TCMPCOM.COMID(feed)" shown in a middle part in FIG. 8. This implies that a column COMID pointed by the distal end of the arrowhead line in the CT_TCMPCOM table is accessed posterior to a column USRCOMP in the CT_TUSRPAR at the proximal end of the arrowhead line. Further, an element "TYPE=1:1" represents a 1:1 relation between CT TCMPCOM and CT_TCMCOM.

It is to be noted that the CT_TUSRPAR table has a table name CT_TUSRPAR, 3000 records as a presumed value of the number of records, and, as columns, a user management number USERNUM, a user name USRNAME, a password USRPWD, a user belonging company USRCOMP, a user belonging office USROFFICE, a user belonging organization USRBELONG, a user mail address MAILADDR, a user telephone number PHONENUMBER, a user FAX number FAXNUMBER, wherein a primary key uniquely determining the record is USERNUM.

(Process of Generating Standard Access Sequence)

Figure 10:
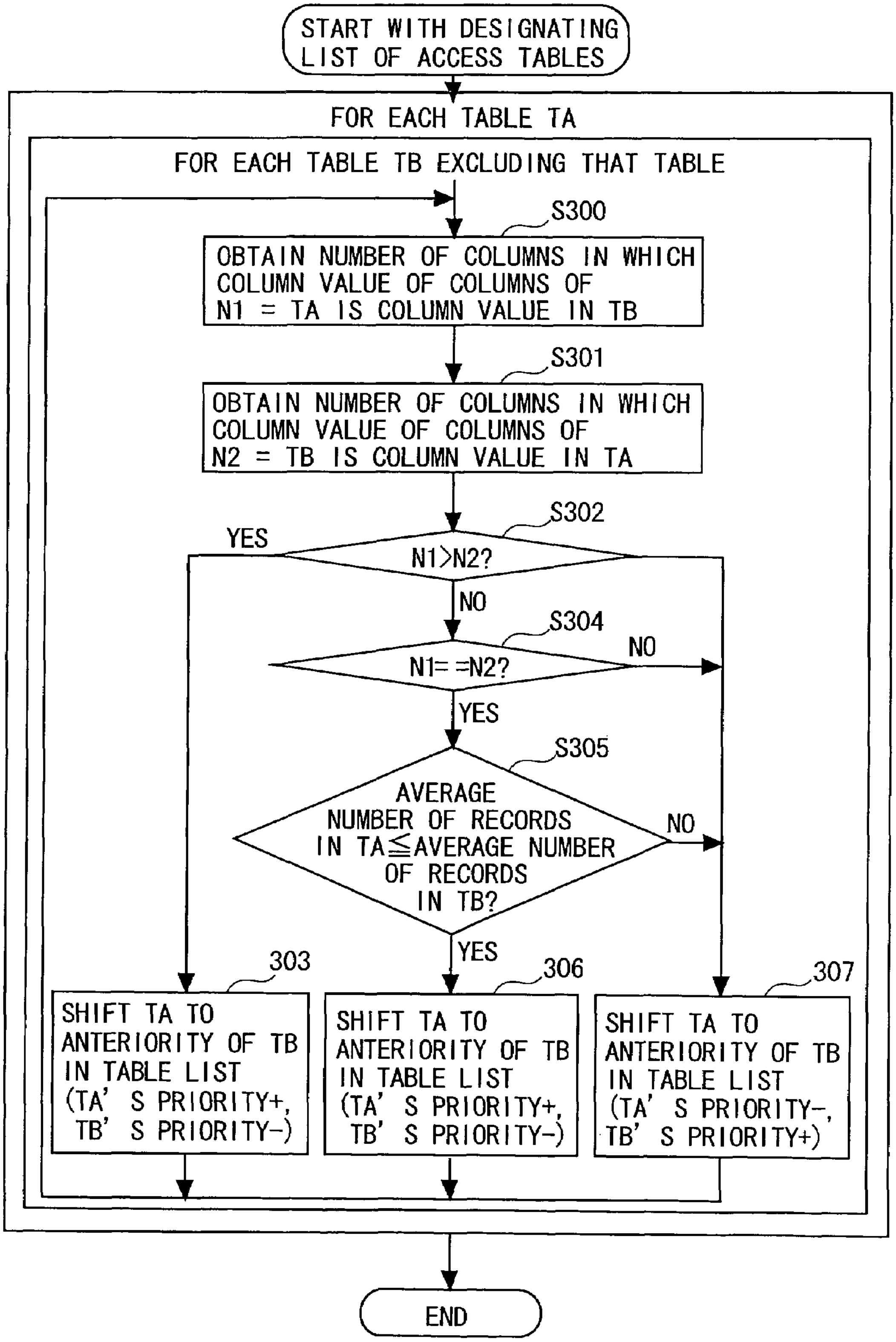
FIG. 10 is an explanatory flowchart of a process of generating a standard data access sequence.

Given next is an explanation of a process in which the standard access sequence generation device M2 generates the standard access sequence D2. FIG. 10 is an explanatory flowchart of the process of generating the standard access sequence. The process procedures are given as below.

The standard access sequence generation device M2 executes, for every table TA shown in FIG. 7, the following processes in a relation between the table TA and each table TB different from the table TA.

The standard access sequence generation device M2 selects one of the tables TA as a process object from among the plurality of tables shown in FIG. 7, and obtains a number N1 of the columns in the columns of the table TA in which the column value thereof is the column value in each table TB, and also a number N2 of the columns in the columns of the table TB in which the column value thereof is the column value in the table TA (S300, S301).

Next, the standard access sequence generation device M2 compares N1 with N2, and judges whether N1>N2 is established or not (S302). As a result, if N1 is larger than N2 (S302: Yes), the access sequence of the table TA is set anterior to the table TB (S303). For instance, an arrangement sequence in the list is changed. Alternatively, an access priority to the table TB is decremented by incrementing an access priority to the table TA.

While on the other hand, as a result of the judgment in S302, when N1=N2 (S302: No, S304: Yes), the standard access sequence generation device M2 compares a average record count (obtained from a header field in the data specifications shown in FIG. 9) of the table TA with an average record count of the table TB, and judges whether or not the table TA average record count <=the table TB average record count (S305).

As a consequence, if the table TA average record count <=the table TB average record count (S305: Yes), the access sequence of the table TA having the smaller average record count is set anterior to the table TB having the larger average record count (S306). For example, the arrangement sequence in the list is changed. Alternatively, the priority of the table TA having the smaller average record count is incremented, and the priority of the table TB having the larger average record count is incremented.

While on the other hand, as a result of the judgment in S304, when N1 is smaller than N2 (S302: No, S304: No), the access sequence of the table TB is set anterior to the table TA. For instance, the arrangement sequence in the list is changed. Alternatively, the access priority to the table TB is incremented, while the access priority to the table TA is decremented.

Incidentally, when N1 is equal to N2 (S302: No, S304: Yes) as a result of the judgment in S304, and in a case where the average record counts are equal to each other as a result of the judgment in S305, the access sequence of the table TA is set anterior to the table TB in a case where the column value of the table TA is, for instance, a value of the primary key of the table TB. Alternatively, the access priority to the table TA is incremented, while the access priority to the table TB is decremented.

The standard access sequence generation device M2 selects one of the next tables TA as the process object and repeats the processes in S300 through S307 till the tables selectable from the plurality of tables shown in FIG. 7 disappear.

Through the processes described above, an eventually obtained table sequence (or a sequence in which the tables are arranged in the sequence from the highest priority) becomes the standard table access sequence.

FIG. 11 is an explanatory diagram of an example of the standard data access sequence. FIG. 11 shows the standard access sequence to the plurality of tables shown in FIG. 7, wherein the tables are sequenced such as the purchase request slip table, the item information table, the purchase applicant information table, the person-in-charge-of-sales information table, the commercial article information table, the price information table, the purchase enterprise information table and the sales enterprise information table.

(Deadlock Pre-Detection Device)

The deadlock pre-detection device M3 generates, based on the process sequence of each route and the standard access sequence, deviation information D3 from the standard access line (system) by executing processes (see FIG. 12) which will be described later on.

(Deviation Information Generating Process)

Figure 12:
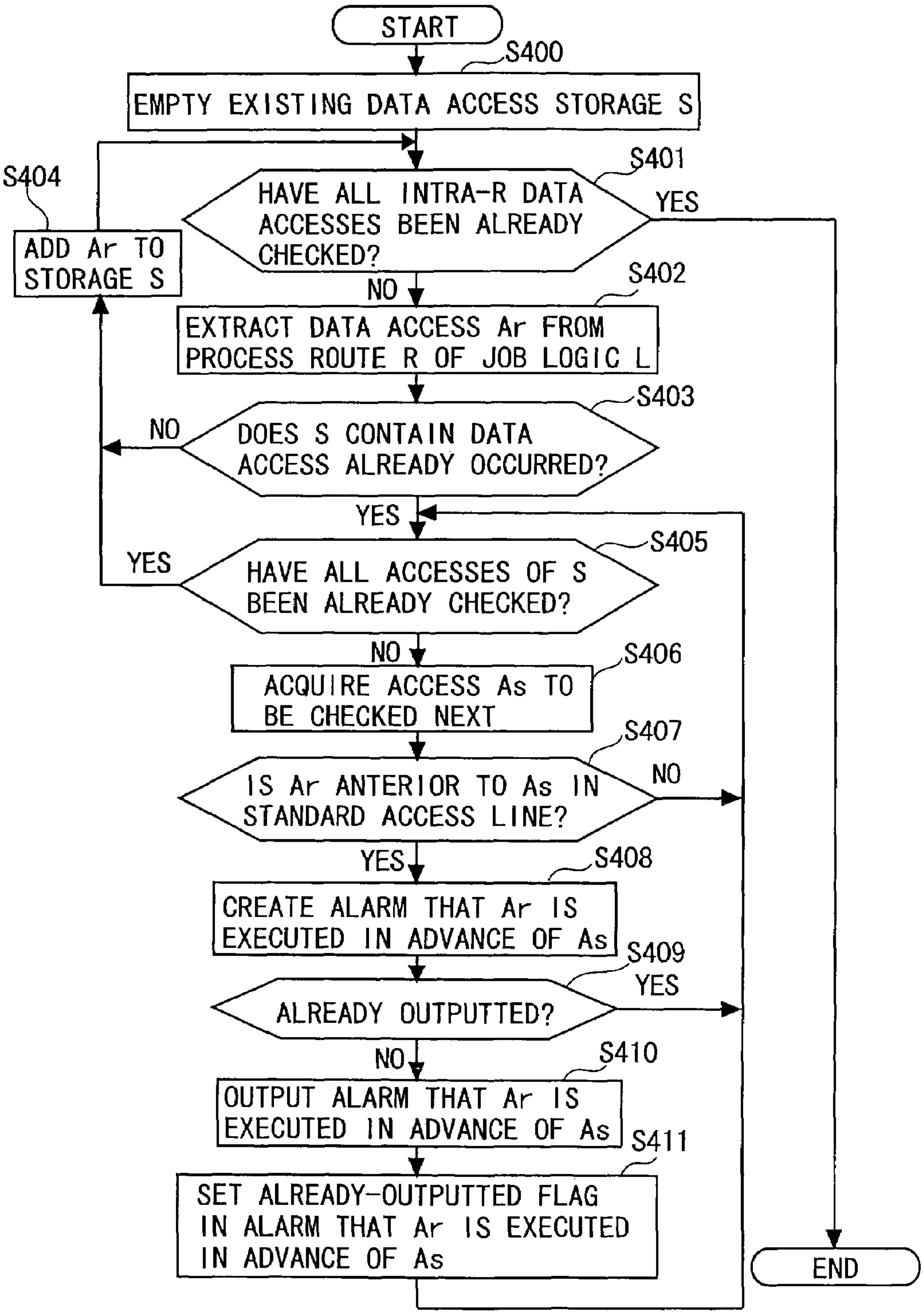
FIG. 12 is an explanatory flowchart of a process of generating deviation information.

Given next is an explanation of a process in which the deadlock pre-detection device M3 generates the deviation information D3 from the standard access line on the basis of the process sequence D12 of each route and the standard access sequence D22. FIG. 12 is an explanatory flowchart of a process of extracting the deviation information from the access sequence in an unspecified route having the job logic shown in FIG. 6. Process procedures are given as below.

The deadlock pre-detection device M3 executes the following processes with respect to each process route (the access sequence of each route).

The deadlock pre-detection device M3 empties a storage S for storing the already-occurred data accesses to one unspecified process route R (S400). The deadlock pre-detection device M3 extracts one by one data accesses Ar in the process route R (S401: No, S402). Note that in the case of having extracted all the data accesses Ar, the process terminates (S401: Yes).

Next, the deadlock pre-detection device M3 judges whether or not the storage S contains the already-extracted data accesses AR (S403). If there are none of the data accesses AR (S403: No), the data access AR is stored on (added to) the storage S, and the process returns to S401 (S404).

While on the other hand, as a result of the judgment in S403, if there are the already-extracted data accesses Ar (S403: Yes), a check object data access is read from the storage S (S406), and the deadlock pre-detection device M3 judges by referring to the standard data access sequence whether or not the data access Ar is anterior to a data access As (S407). As a result, if the data access Ar is anterior to the data access As (S407: Yes), the deadlock pre-detection device M3 creates such an alarm that the data access Ar is executed ahead of the data access As (S408).

Then, the deadlock pre-detection device judges whether or not the alarm with this purport has already been outputted (the judgment is made based on, e.g., a flag which will hereinafter be mentioned) (S409), then outputs the alarm with this purport (S410) if not already outputted (S409: No), and sets a flag showing that the alarm has already been outputted (S411).

Figure 13:
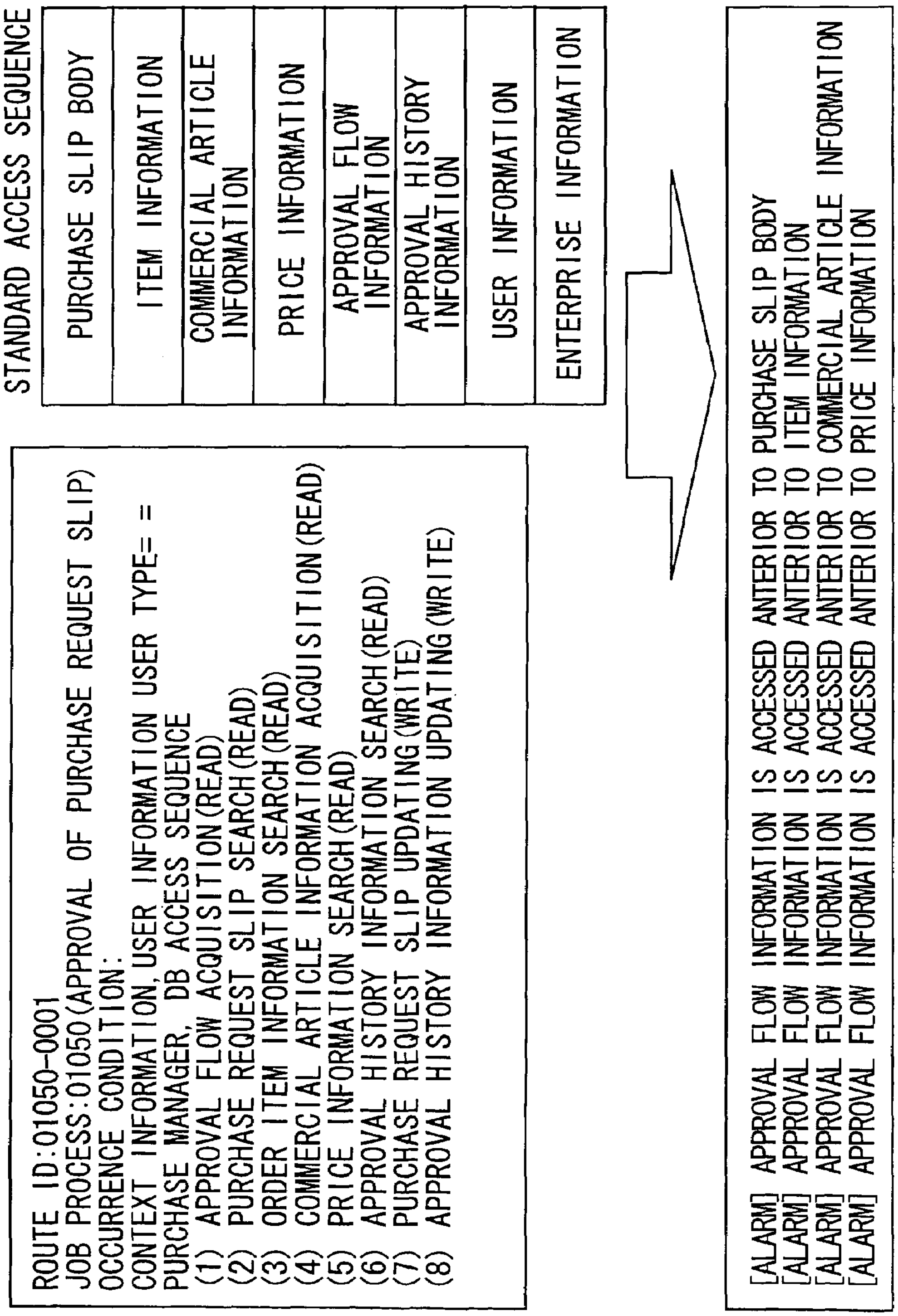
FIG. 13 is an example of the deviation information, etc.

Note that a variety of output modes of the alarm can be considered, however, herein, as shown in FIG. 13, the alarm is outputted (notification) as a log (e.g., a log file). The processes in S406 through S411 are executed for all the data accesses As stored on the storage S (S405). Upon a completion of the processes for all the data accesses As (S405: Yes), the deadlock pre-detection device M3 stores (adds) the data access on the storage S, and returns to S401 (S404).

Through the processes described above, the deviation information shown in a lower part in FIG. 13 is acquired. A job system designer, etc. becomes able to modify the data access sequence of the job logic that does not conform with the standard data access sequence by referring to the deviation information so that the data access sequence of the job logic becomes the standard data access sequence.

FIG. 13 is an example of the deviation information of the data access sequence in an unspecified route of unspecified job logic with respect to the standard access sequence. In FIG. 13, the standard table access sequence is: (1) the purchase slip body, (2) the item information, (3) the commercial article information, (4) the price information, (5) the approval flow information, (6) the approval history information, (7) the user information and (8) the enterprise information.

By contrast with this, in a process route 01050-0001 "the process route in a case where a type of the user is a purchase manager" of job logic 01050 "the approval of the purchase request slip", the sequence is: (1) the approval flow acquisition (Read), (2) the purchase request slip search (Read), (3) the order item information search (Read), (4) the commercial article information acquisition (Read), (5) the price information search (Read), (6) the approval history information search (Read), (7) the purchase request slip update (Write) and (8) the approval history information update (Write).

As compared with the standard table access sequence, a difference is that the approval flow information is accessed anterior to the four tables of the purchase slip information, the item information, the commercial article information and the price information. Accordingly, in alarming, the alarms are given respectively to the differences in the access sequence with respect to these four tables on the basis of the approval flow information from the standard table access sequence.

(Multi-Access Time Deadlock Pre-Detection Device)

The multi-access time deadlock pre-detection device M4 generates, based on the process sequence D12 of each route and the multi-access operation line (system) description D11, multi-access deadlock possibility information D4 by executing processes (FIG. 16) which will be explained later on.

(Multi-Access Description)

Figure 14:
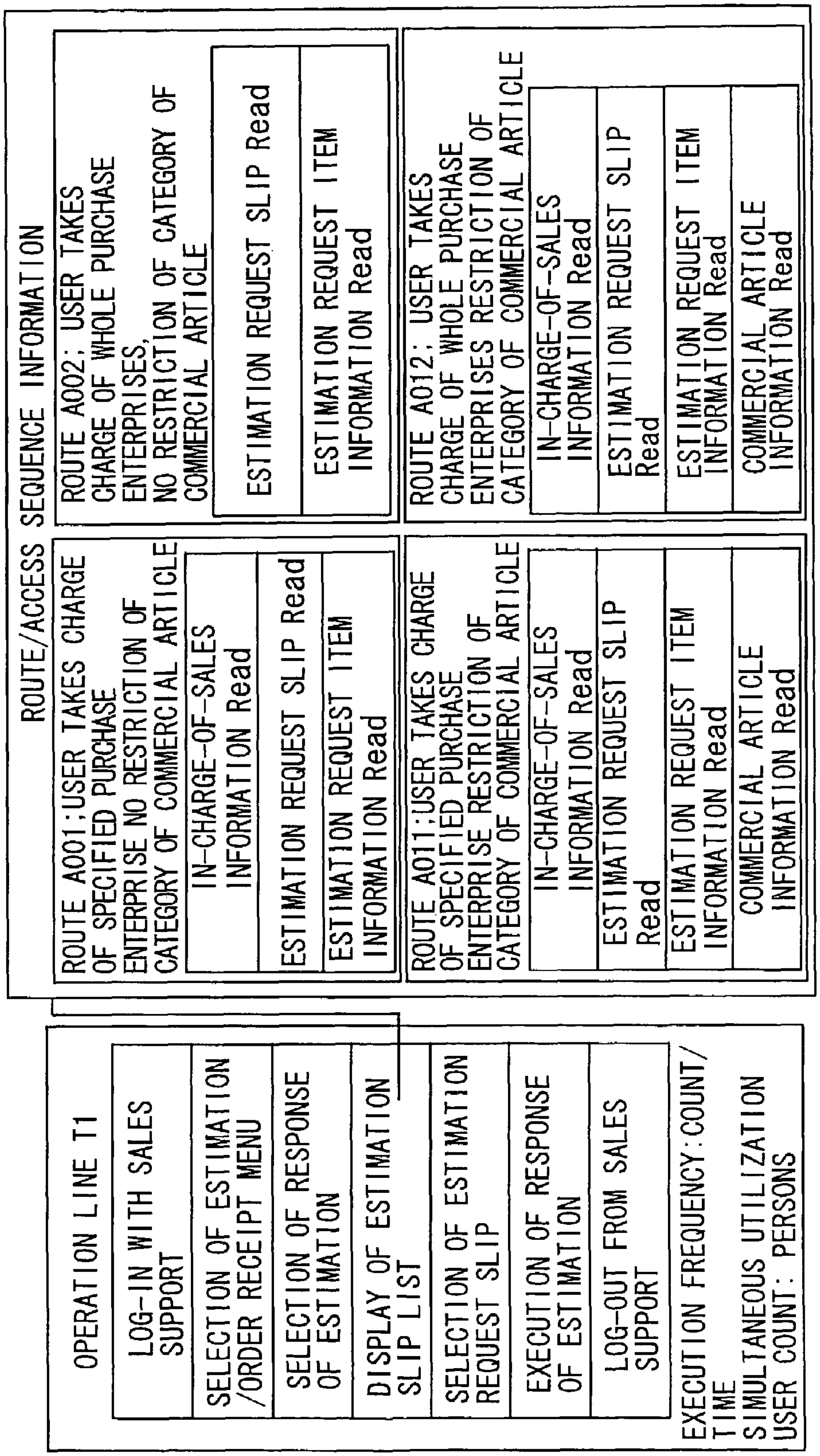
FIG. 14 is an example of a description of an operation line for multi-accessing.

FIG. 14 is an example of a multi-access description, i.e., pieces of information expressing a job logic execution sequence and an execution line of pieces of job logic which are executed simultaneously.

In FIG. 14, an operation line (system) T1 executes following pieces of job logic in the sequence that follows. (1) A log-in to a sales support is done. (2) An estimation/order receipt menu is selected. (3) An estimation reply is selected. (4) A display of an estimation slip list is selected. (5) One estimation request slip is selected from the list displayed. (6) The estimation reply is executed for the selected estimation request slip. (7) A log-out from the sales support is done.

Among the pieces of job logic given above, the pieces of logic involving an execution of the actual access to the database are (1), (4), (5), (6) and (7). The pieces of logic (2) and (3) involve an execution of only screen scrolling but does not involve the execution of the access to the database. Hence, in a deadlock check that will be described hereafter, (2) and (3) are ruled out of a check object.

Further, in the estimation slip list display in (4), the following four routes exist.

Route A001: The user takes a charge of a specified purchase enterprise, and deals with an arbitrary category of commercial article. The data access sequence is: the in-charge-of-sales information the estimation request slip the estimation request item information.

Route A002: The user takes a charge of the whole purchase enterprises and deals with an arbitrary category of commercial article.

The data access sequence is: the estimation request slip the estimation request item information.

Route A003: The user takes a charge of a specified purchase enterprise and deals with an arbitrary category of commercial article. The data access sequence is: the in-charge-of-sales information the estimation request slip the estimation request item information the commercial article information.

Route A004: The user takes a charge of the whole purchase enterprises and deals with an arbitrary category of commercial article. The data access sequence is: the in-charge-of-sales information the estimation request slip the estimation request item information the commercial article information.

Figure 15:
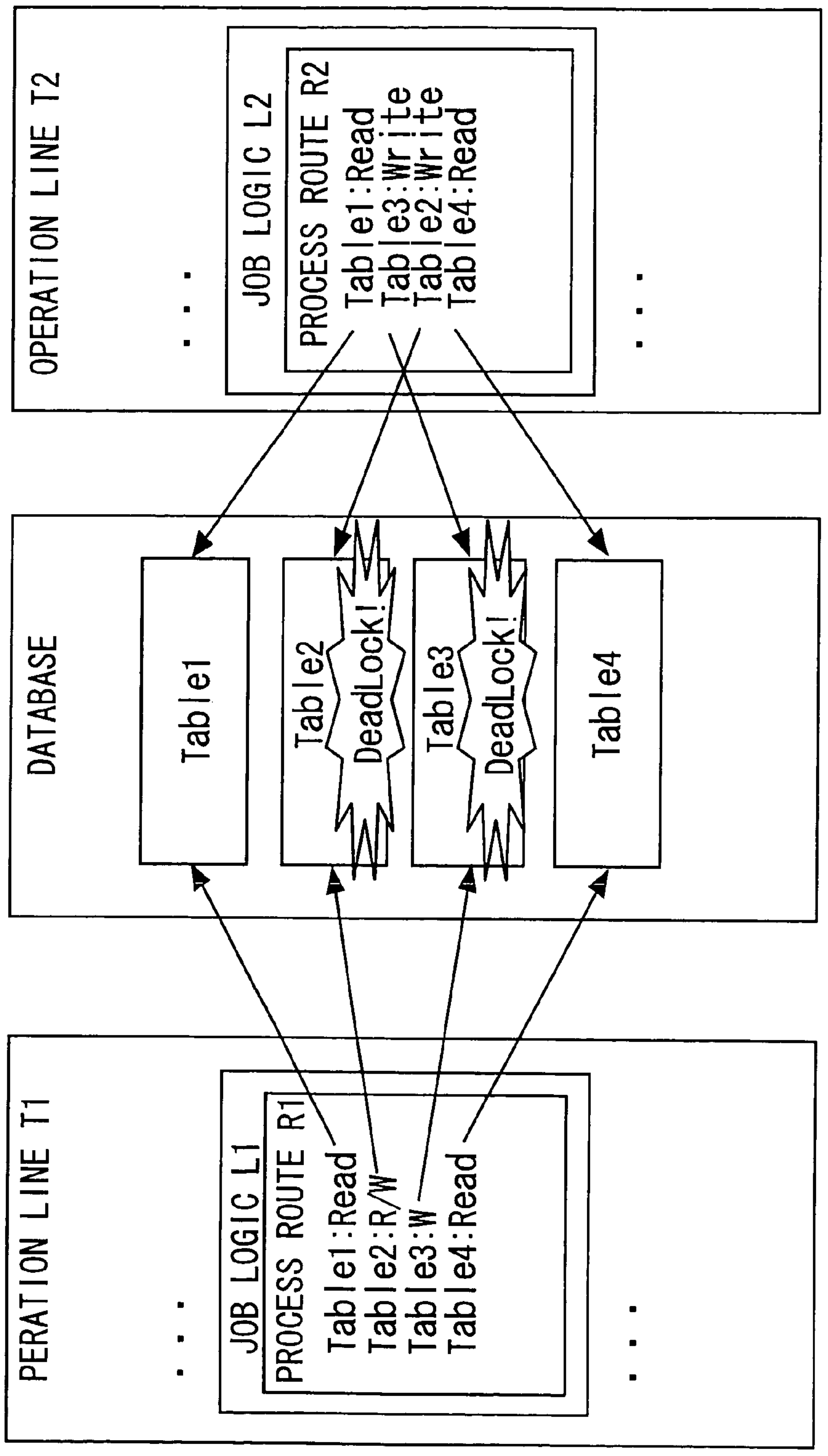
FIG. 15 is an example of a deadlock possibility detected from a multi-access description in FIG. 14 and from access sequence information in FIGS. 4 and 5.

FIG. 15 is an example of a deadlock possibility detected from the multi-access description in FIG. 14 and from the access sequence information in FIGS. 4 and 5. In FIG. 15, a process route R1 exists in job logic L1 in the operation line T1, and the tables are accessed in this sequence: Table1 (Read) Table2 (Read/Write) Table3 (Write) Table4 (Read). On the other hand, a process route R2 exists in job logic L2 in the operation line T2, and the tables are accessed in this sequence: Table1 (Read) Table3 (Write) Table2 (Write) Table4 (Read). Hereat, in a case where R1 and R2 are simultaneously executed, there occurs a possibility of the deadlock in Table2 and Table3.

Figure 16:
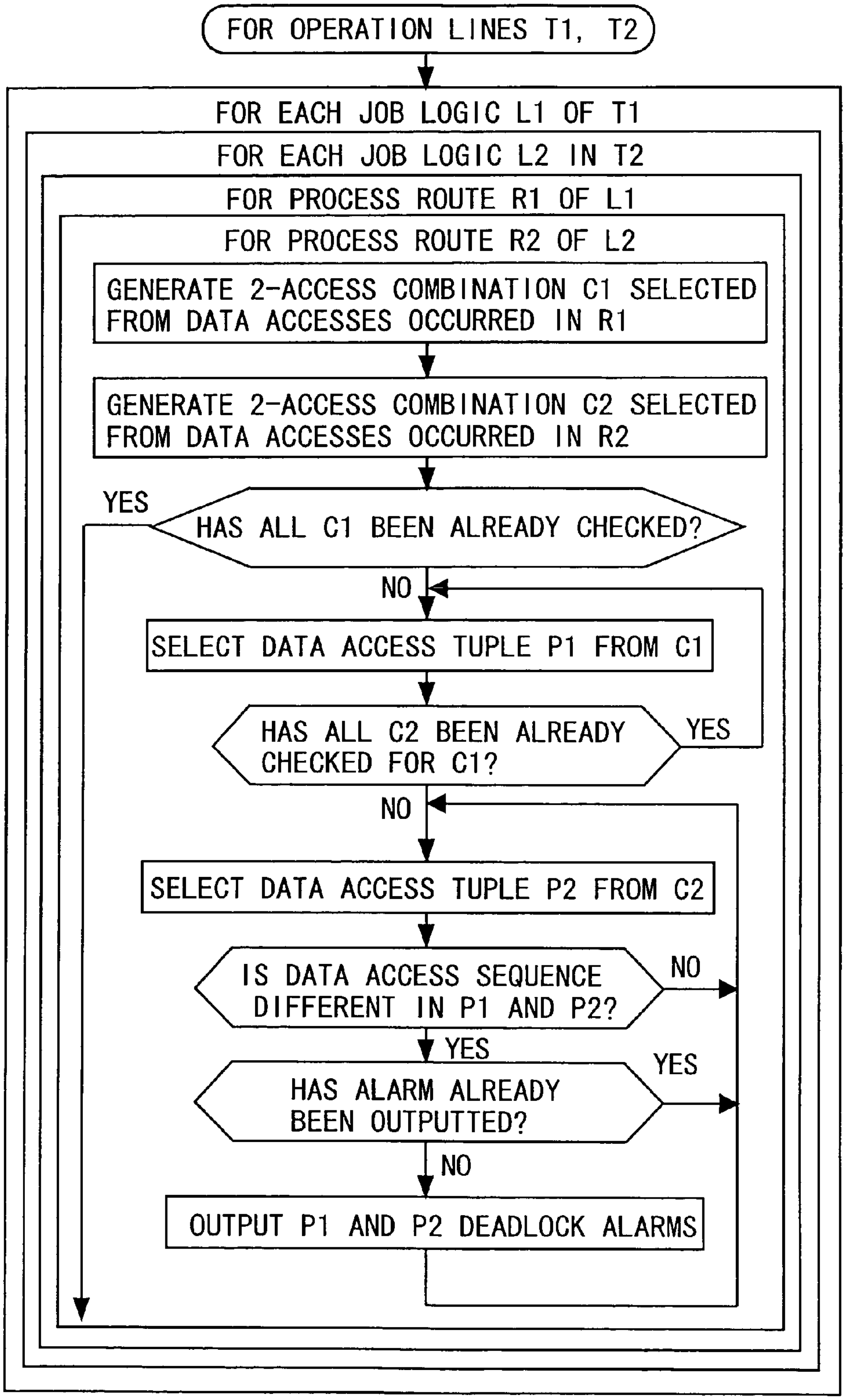
FIG. 16 is an algorithm for detecting the deadlock at the multi-access time.
Figure 17:
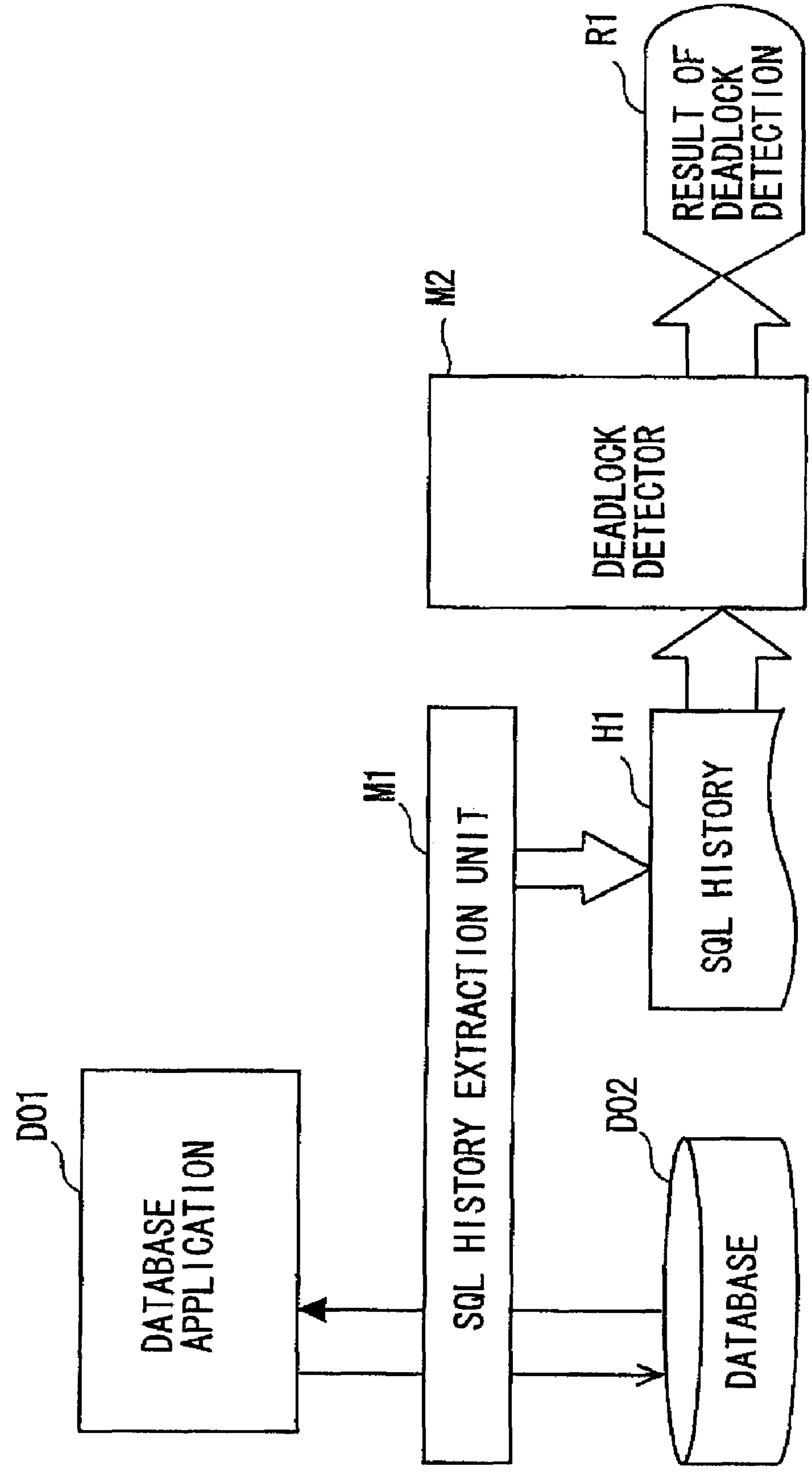
FIG. 17 is an explanatory diagram of a conventional deadlock detection method.

FIG. 16 shows an algorithm for detecting the deadlock at the multi-access time shown in FIG. 15 from the multi-access description in FIG. 14 and from the access sequence information in FIGS. 5 and 6. The following process procedures are executed for combinations of all the operation lines T1, T2.

(1) The following is executed for each piece of job logic L1 of T1 and for each piece of job logic L2 of T2.

(2) The following is executed for each process route R1 of L1 and for each process route R2 of T2.

(3) A combination C1 of arbitrary two pieces of data accesses selected from the data accesses occurring in R1, is generated.

(4) A combination C2 of arbitrary two pieces of data accesses selected from the data accesses occurring in R2, is generated.

(5) The following is executed for a pair P1 of the data accesses of C1.

(6) A pair P2 of the data accesses having the same data access as P1 has, is extracted out of the pairs of the data accesses of C2.

(7) If the data access sequences in the pair P1 and the pair 2 are opposite to each other, the deadlock possibility is judged to exist in the data accesses contained in P1 and P2 between R1 and R2, and a message giving an alarm of the deadlock possibility is outputted (it is checked whether the message has already been outputted or not, and, if not, the message is outputted).

In the case of a large cost for checking all the combinations, the operation lines to be checked can be narrowed down in, for example, the following manner.

(A) Each operation line (or the job logic, the process route in the job logic) is given a piece of occurrence frequency information (an occurrence count per unit time). If the occurrence frequency is equal to or smaller than a fixed threshold value, this operation line (or the job logic, the process route in the job logic) is ruled out of the check object.

(B) In the case of no occurrence frequency information, a flag information indicating whether the deadlock check is performed for the data table or not, is set, and, when performing the deadlock check for the pair of data accesses, the check is conducted only in a case where the flag for effecting the deadlock (check) is set ON in every table as the check object.

As discussed above, the deadlock prevention system (program) in the embodiment exhibits the following effects.

(1) Improvement of maintainability of job system: It is possible to unify the creation of the job logic that builds up the job system by making the data access process lines pursuant to all the job logic. The creation of the job logic is unified, thereby gaining a well perspective of the program describing the job logic. Namely, the maintainability of the whole job system is improved.

(2) Ensuring of quality of job system: In the job system utilized under the multi-access environment, the deadlock possibility is thoroughly detected at the design stage, and all the deadlocks that might occur are searched out, whereby measures for preventing the searched-out deadlocks can be taken. It is therefore feasible to make an elaborate creation of quality pertaining to the prevention of the deadlock at the design stage.

(3) Reduction of development period of job system: As compared with the system for taking the measure after detecting the deadlocks one by one at a testing stage, manual operation returns can be reduced. Therefore, a development period of the job system including the design, the development and the test, can be reduced as close as ⅔ to ½.

The invention can be applied to the following fields.

In a device for executing the job process by utilizing the data storage structured of a plurality of data sets (aggregations), the invention is applied to the pre-detection of a resource conflict (deadlock) at the design stage before the operation, the conflict being caused by the simultaneous accesses to the same data from a plurality of job processes.

What can be considered as examples of the data storage may be a relational database (wherein the data set is a table, and a tuple of respective pieces of data is a record) and an object-oriented database (having a data structure, wherein the data set is an aggregation of objects, and each piece of data is an object). It is considered that the device is exemplified such as an electronic commerce system, an accounting system, a transaction information management system, an electronic catalogue management system, and so on.

In the case of the electronic commerce system, the system has tables such as user information, enterprise information, an estimation request slip, a purchase request slip, a purchase result information, commercial article information and price information as data sets. The job logic involving the access to these items of data can be exemplified such as an estimation request, issuance of a purchase request slip, approvals for an estimation request and for a purchase request slip, an estimation reply and an order receipt reply, etc.

The invention can be embodied in a variety of forms without deviating from the spirit or the principal features thereof. The embodiments given above are just simple exemplifications in every aspect and should not be construed in a limited manner.

According to the invention, the deadlock possibility can be detected beforehand without actually running the deadlock detection object program. Further, the user is notified of the measure, etc. for avoiding the thus-detected deadlock possibility, whereby the measure, etc. for avoiding the deadlock possibility can be taken.

It is possible to detect the deadlock possibility beforehand without actually running the deadlock detection object program. Further, the measure, etc. for avoiding the deadlock possibility can be adopted by notifying the user of the measure, etc. for avoiding the thus-detected deadlock possibility.

What is claimed is:

1. A computer-readable medium recorded with a deadlock pre-detection program executed by a computer, the program comprising:

a first procedure of reading job logic design information structured of a plurality of process steps including an access step involving an access to any one of a plurality of databases;

a second procedure of generating at least two process routes structured of at least two access steps on the basis of the job logic design information;

a third procedure of acquiring, for every process route, a first access step and a second access step from the process route;

a fourth procedure of judging whether a database access sequence based respectively on the first access step and the second access step is a predetermined access sequence or not; and a fifth procedure of notifying of, in the case of judging that the access sequence is not the predetermined access sequence, a purport of deviating from the predetermined access sequence.

2. A computer-readable medium recorded with a deadlock pre-detection program according to claim 1, further comprising:

a sixth procedure of having associative relational data read out, which represent associative relations between a plurality of databases; and a seventh procedure of generating the predetermined access sequence on the basis of the associative relational data.

3. A computer-readable medium recorded with a deadlock pre-detection program according to claim 1, wherein said third procedure involves acquiring the first access step and the second access step next to the first access step from the process route, said fourth procedure involves judging whether the database access sequence respectively by the first access step and the second access step is the predetermined access sequence or not, and said fifth procedure involves notifying, in the case of judging that the access sequence is not the predetermined access sequence, that the database access by the first access step is conducted anterior to the database access by the second access step.

4. A computer-readable medium recorded with a deadlock pre-detection program according to claim 1, further comprising:

an eighth procedure of having a multi-access description and the process route read out; and a ninth procedure of generating information about a possibility of an occurrence of a deadlock in the case of simultaneously executing the job logic design information structured of the plurality of process steps on the basis of the multi-access description and the process route.

* * * * *